United States Patent
Isgar

(10) Patent No.: US 12,039,625 B2
(45) Date of Patent: *Jul. 16, 2024

(54) DIGITIZED MAIL CONTROL SYSTEM

(71) Applicant: Charles Isgar, Scottsdale, AZ (US)

(72) Inventor: Charles Isgar, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/337,616

(22) Filed: Jun. 20, 2023

(65) Prior Publication Data

US 2023/0334610 A1  Oct. 19, 2023

Related U.S. Application Data

(63) Continuation of application No. 17/503,918, filed on Oct. 18, 2021, now Pat. No. 11,682,096, which is a continuation of application No. 17/134,022, filed on Dec. 24, 2020, now Pat. No. 11,151,681.

(51) Int. Cl.
| | |
|---|---|
| *G06Q 50/60* | (2024.01) |
| *G06F 16/9535* | (2019.01) |
| *G06F 16/955* | (2019.01) |
| *G06K 19/06* | (2006.01) |
| *G06N 5/04* | (2023.01) |

(52) U.S. Cl.
CPC ......... *G06Q 50/60* (2024.01); *G06F 16/9535* (2019.01); *G06F 16/9554* (2019.01); *G06K 19/06009* (2013.01); *G06N 5/04* (2013.01)

(58) Field of Classification Search
CPC . G06Q 50/60; G06F 19/9535; G06F 16/9554; G06K 19/06009; G06N 5/04
See application file for complete search history.

(56) References Cited

U.S. PATENT DOCUMENTS

| | | | |
|---|---|---|---|
| 11,151,681 B1 * | 10/2021 | Isgar | ................ G06K 19/06009 |
| 11,682,096 B2 * | 6/2023 | Isgar | ........................ G06N 5/04 |
| | | | 705/1.1 |
| 2013/0182888 A1 | 7/2013 | Ovando | |
| 2014/0374478 A1 | 12/2014 | Dearing et al. | |

* cited by examiner

*Primary Examiner* — Matthew Mikels
(74) *Attorney, Agent, or Firm* — Schmeiser, Olsen & Watts LLP

(57) ABSTRACT

Described is a digitized mail control system. The system may include a server having a memory storing mail data associated with a user and a user computing device coupled to the server. The server may be programmed to receive an access signal from the user computing device that has accessed the system. In response to receiving the access signal, the server may process the user data and locate the stored mail data associated with the user data. The server may then create and send for execution on the user computing device instruction to display mail data including sender information and action buttons associated with predetermined actions to take in response to the sender information. The server may receive a signal including a selected action associated with a selected action button with regard to a selected sender and automatically execute program code corresponding to the selected action.

7 Claims, 16 Drawing Sheets

DIGITIZED MAIL CONTROL SYSTEM

CROSS REFERENCE TO RELATED APPLICATION[S]

This application is a continuation of earlier U.S. Utility patent application entitled "DIGITIZED MAIL CONTROL SYSTEM," Ser. No. 17/503,918, filed Oct. 18, 2021, which is a continuation of the earlier U.S. Utility patent application entitled "DIGITIZED MAIL CONTROL SYSTEM," Ser. No. 17/134,022, filed Dec. 24, 2020, now U.S. Pat. No. 11,151,681, issued Oct. 19, 2021, the disclosures of which are hereby incorporated entirely herein by reference.

BACKGROUND OF THE INVENTION

Technical Field

This invention generally relates to a system for controlling mail delivered from mail/shipping services, and more specifically to a system for digitally capturing and aggregating sender information of personal and bulk mail/packages delivered from mail/shipping services and controlling actions responsive to the digitally captured and aggregated sender information.

State of the Art

Mail and shipping services essentially scan every piece of mail that utilizes the services. This can be in the form of scanning codes associated with senders and recipients of the letters or parcels being delivered. Additionally, these mail and shipping services may also scan or otherwise take images of the mail being delivered with the mail or shipping service. Further still, some mail or shipping services can provide images of the mail being delivered to the recipient of the mail prior to delivering the mail to the mail box or home of the recipient. This data is typically stored on servers operated by the mail or shipping service and is utilized for various purposes, such as, but not limited to, providing images of mail to law enforcement if required to do so. However, there lacks a system that can utilize this data captured by mail and shipping services in a system that provides control of actions to take with respect to senders to the recipient.

Accordingly, what is needed is a system for digitizing and storing sender information of mail to recipients and providing access to the data for actions to take with respect to the various senders who have sent mail to the recipient.

SUMMARY OF THE INVENTION

An embodiment includes a digitized mail control system comprising: a server having a memory storing mail data associated with a user; and a user computing device coupled to the server, wherein the server is programmed to: receive an access signal from the user computing device that has accessed the system, wherein the access signal includes user data; in response to receiving the access signal from the user computing device, process the user data and locate the stored mail data associated with the user data; create and send for execution on the user computing device instruction to display mail data including sender information of mail received on a user-selected date and action buttons associated with predetermined actions to take in response to the sender information; and receive a signal including a selected action associated with a selected action button with regard to a selected sender and automatically execute program code corresponding to the selected action.

A digitized mail control system comprising: a server having a memory storing mail data associated with a user; and a user computing device coupled to a scanning system and coupled to the server, wherein the server is programmed to: receive an access signal from the user computing device that has accessed the system, wherein the access signal includes user data; in response to receiving the access signal from the user computing device, process the user data and locate the stored mail data associated with the user data; receive a signal from the user computing device including images of mail received by the user computing device from the scanning system; automatically process the scanned images of mail and create additional mail data associated with the user and store the same in the memory of the server; automatically create and send for execution on the user computing device instruction to display mail data including sender information of mail received by the recipient and action buttons associated with predetermined actions to take in response to the sender information; and receive a signal including a selected action associated with a selected action button with regard to a selected sender and automatically execute program code corresponding to the selected action.

A digitized mail control system comprising: a server having a memory storing mail data associated with a user; a third-party server coupled to the server; and a user computing device coupled to the server, wherein the server is programmed to: send a signal to the third-party server requesting mail data stored on the third-party server; receive a signal from the third-party server including third-party mail data associated with the user stored on the third-party server; automatically process the third-party mail data associated with the user and store the same in the memory of the server as part of the mail data associated with the user; receive an access signal from the user computing device that has accessed the system, wherein the access signal includes user data; in response to receiving the access signal from the user computing device, process the user data and locate the stored mail data associated with the user data; automatically create and send for execution on the user computing device instruction to display mail data including sender information of mail received by the recipient and action buttons associated with predetermined actions to take in response to the sender information; and receive a signal including a selected action associated with a selected action button with regard to a selected sender and automatically execute program code corresponding to the selected action.

The foregoing and other features and advantages of the invention will be apparent to those of ordinary skill in the art from the following more particular description of the invention and the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Embodiments of the present invention relate to a system for digitally capturing and aggregating sender information of mail/packages delivered from mail/shipping services and controlling actions responsive to the digitally captured and aggregated sender information. The system may include the use of a mobile application operating on a user computing device that may be a mobile computing device like a smartphone, a tablet, a wearable, and the like; and/or the system may operate on any type of computing device as a downloadable application or even as a web application.

The benefits of the system provided for in this application are particularly useful for areas where governments and municipalities are seeking to have government entities and mail services do things like modernize their websites, digitize services and forms, accelerate use of e-signatures, improve customer experience, and/or standardize and transition to centralized shared services. Further still, governments have desires to ensure that the government adjusts to the new digital world and work to procure and manage devices, applications and data in smart, secure and affordable ways, and ensure that the government unlock the power of government data to spur innovation across the country and improve quality of services for citizens.

Additionally, the system may provide benefits of reducing waste, such as, but not limited to, reducing the tons of material generated by paper mail, reduce an individual's footprint, and/or create and distribute materials electronically. Email accounts have filters that keep out most spam. However, regular mail boxes at home and the office do not have the same capability. For example, and without limitation, advertisement arrives in the post daily, by the sheaf and by the ream. US merchants pay upwards of $30 billion a year to produce and distribute junk mailings, and less than half of it even gets opened. Junk mail has environmental implications. Among US manufacturing industries, papermaking is the first-ranked consumer of water (per ton of product), third-ranked consumer of energy, third-ranked emitter of toxic pollutants into the air, fourth-ranked emitter of greenhouse gases, and fourth-ranked emitter of toxic pollutants into water. Accordingly, operation of the mail control system has lasting and sustaining effects on the environment and waste.

Figure 1:
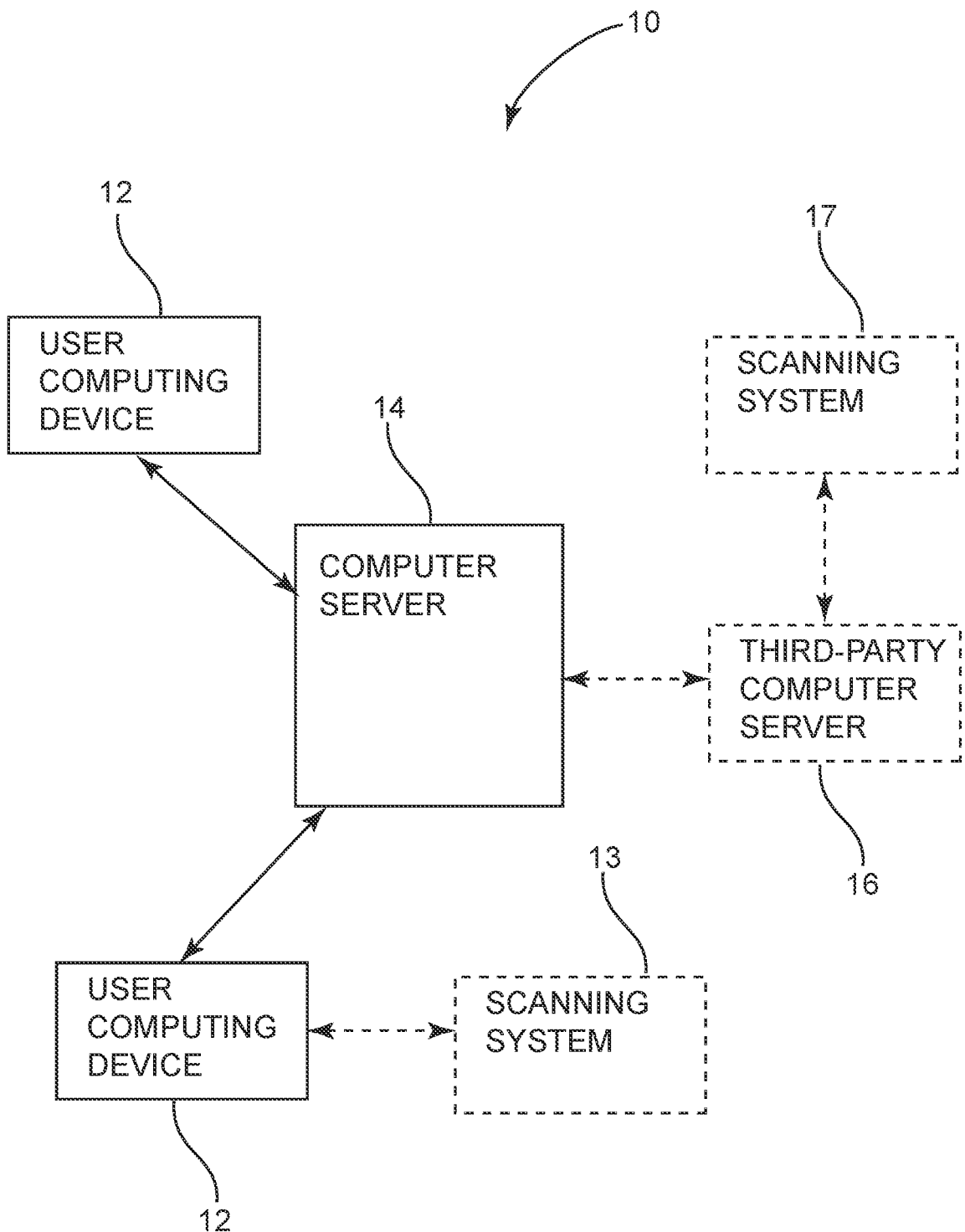
FIG. 1 is a diagrammatic view of a digitized mail control system according to an embodiment.

FIG. 1 depicts an embodiment of a digitized mail control system 10. The system 10 may include user computing devices 12 and a server 14, wherein each user computing device 12 is coupled to the computer server 14. The coupling between each user computing device 12 and the server 14 may be a network connection, such as a wireless connection through an Internet connection, a Wi-Fi connection, a Bluetooth connection, or the like, wherein the user computing device 12 may communicate with and receive communication from the server 14. The user computing device 12 may be a desktop computer, a laptop, a tablet, a smartphone, a wearable device, and the like. The server 14, in some embodiments, may be a computer server or a cloud-based infrastructure architecture.

The server 14 may include a memory storing mail data and user data. The memory of the server 14 may store user data, such as a username, a password, and profile information, including name, address and/or other identifying information. The server 14 may also store mail data associated with each user, wherein the mail data includes sender information and/or images of mail with sender information on the imaged mail for a recipient. The server 14 may also include user preferences stored on the server, wherein the user preferences are associated with the mail data associated with the user data. The user preferences may include a category for each sender, actions to take with senders within certain categories, and so forth.

Mail data may be captured in various ways. One way is that the user may scan or image the mail as he or she receives delivered mail from a mail or shipping service using a scanning system 13 as shown in FIG. 1. The scanning system 13 may be coupled to the user computing device and may be a scanning device and communication hardware to communicate the scanned images to the user computing device 12. In some embodiments, the scanning system may be a software product operating on the user computing device 12 that utilizes a camera of the user computing device as the imaging device and the internal hardware allows for the saving and sending of the image to the server 14. The user may use a user computing device 12 to upload the scanned or imaged mail to the server 14 and store the scanned or imaged mail on the server 14, wherein the server automatically associates the uploaded scanned or imaged mail with the user data associated with the user accessing the system using the user computing device 12. The server 14 may be programmed to utilize optical character recognition ("OCR") to convert the sender name and address and the recipient name and address on each piece of scanned or imaged mail to useable digital text that is machine readable and recognizable. This data may also be stored as part of the mail data. In some embodiments, the server 14 may also be coupled to a third-party server 16, wherein the third-party server 16 may be a server of a mail or shipping service that stores digitized scans or images of mail being delivered using the mail or shipping service. The digitized scans or images of mail with the third-party server 16 may utilize a scanning system 17 coupled to the third-party server 16, wherein the scanning system 17 may be a scanning device and communication hardware to communicate the scanned images to the third-party server 16, including the scanning of barcodes applied to pieces of mail. The server 14 may be programmed to receive the digitized scans or images of mail associated with users of the system 10 and store the digitized scans or images of mail in memory on the server 14 as part of the mail data, wherein the digitized scans may be delivered from the user computing device 12 and/or a third-party server 16. It will be understood that the mail data may be aggregated and continually added to as more mail for delivery to the user is scanned or imaged. The server 16 may apply OCR, as needed, to the mail data received from the third-party server 16 prior to sending to the server 14.

In operation of the system 10, the user computing device 12 may be coupled to the server 14, and the server 14 may be programmed to receive an access signal from the user computing device that has accessed the system, wherein the access signal includes user data; in response to receiving the access signal from the user computing device, process the user data and locate the stored mail data associated with the user data; create and send for execution on the user computing device instruction to display mail data including sender information of mail received on a user-selected date and action buttons associated with predetermined actions to take in response to the sender information; and receive a signal including a selected action associated with a selected action button with regard to a selected sender and automatically execute program code corresponding to the selected action.

Figure 2:
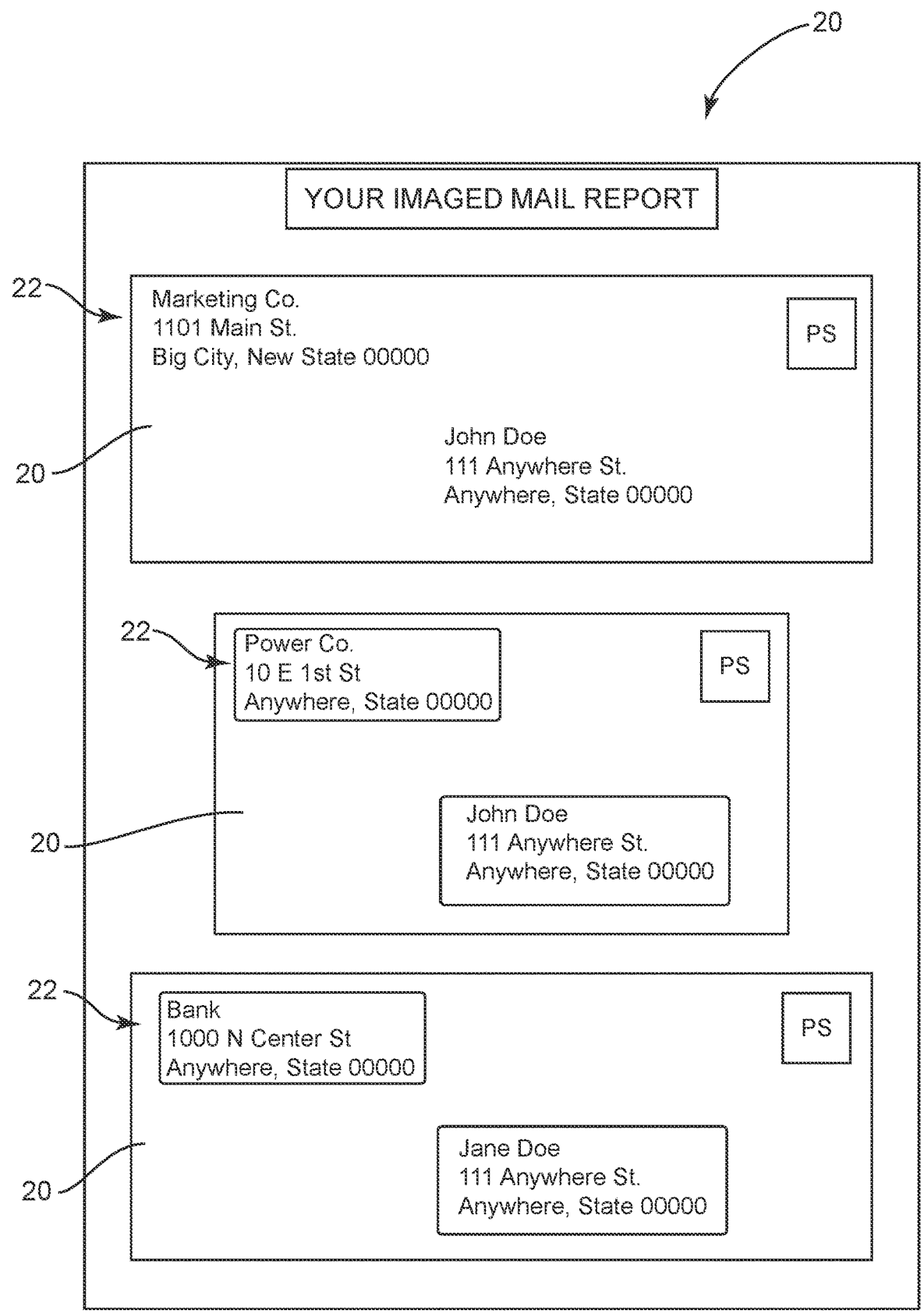
FIG. 2 is a user interface of a user computing device operating on a digitized mail control system according to an embodiment.
Figure 3:
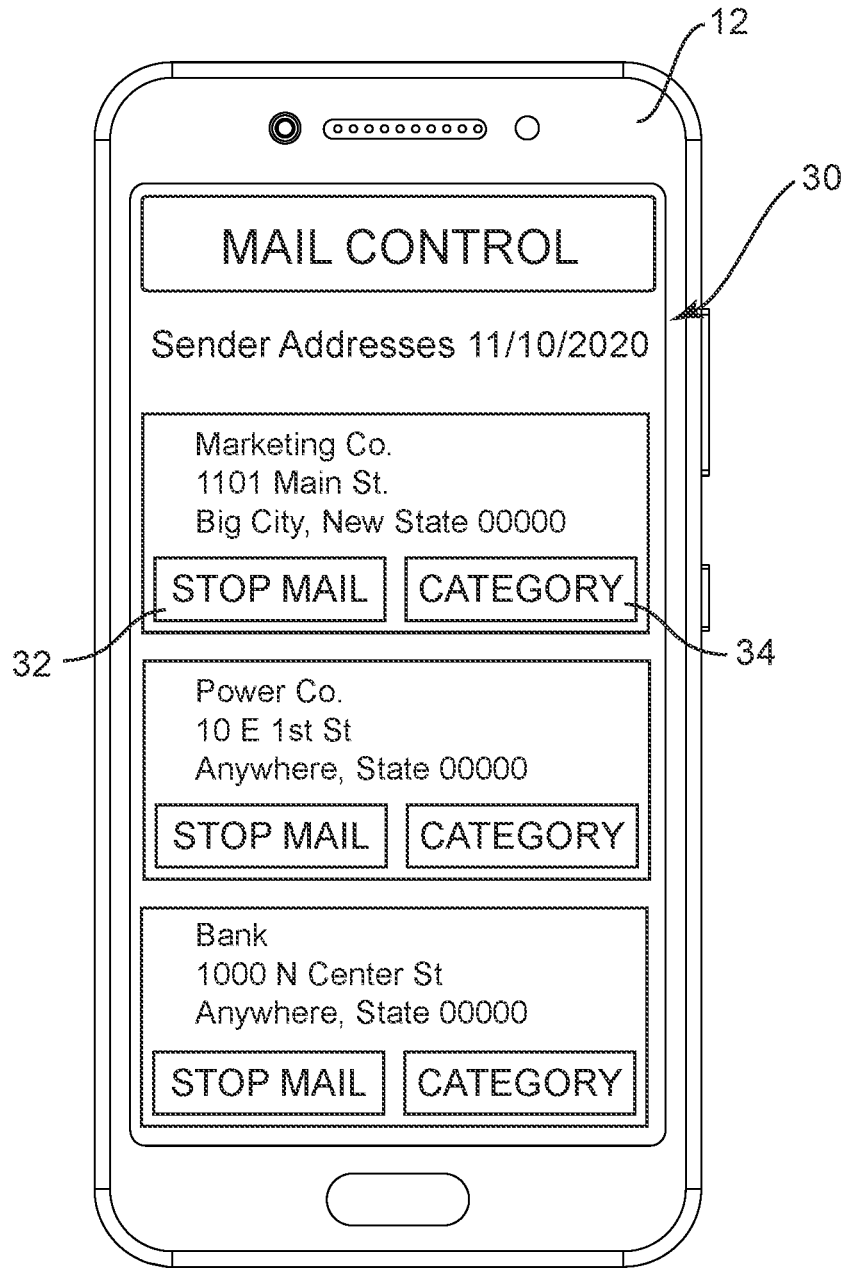
FIG. 3 is a front view of a user computing device operating on a digitized mail control system according to an embodiment.
Figure 4:
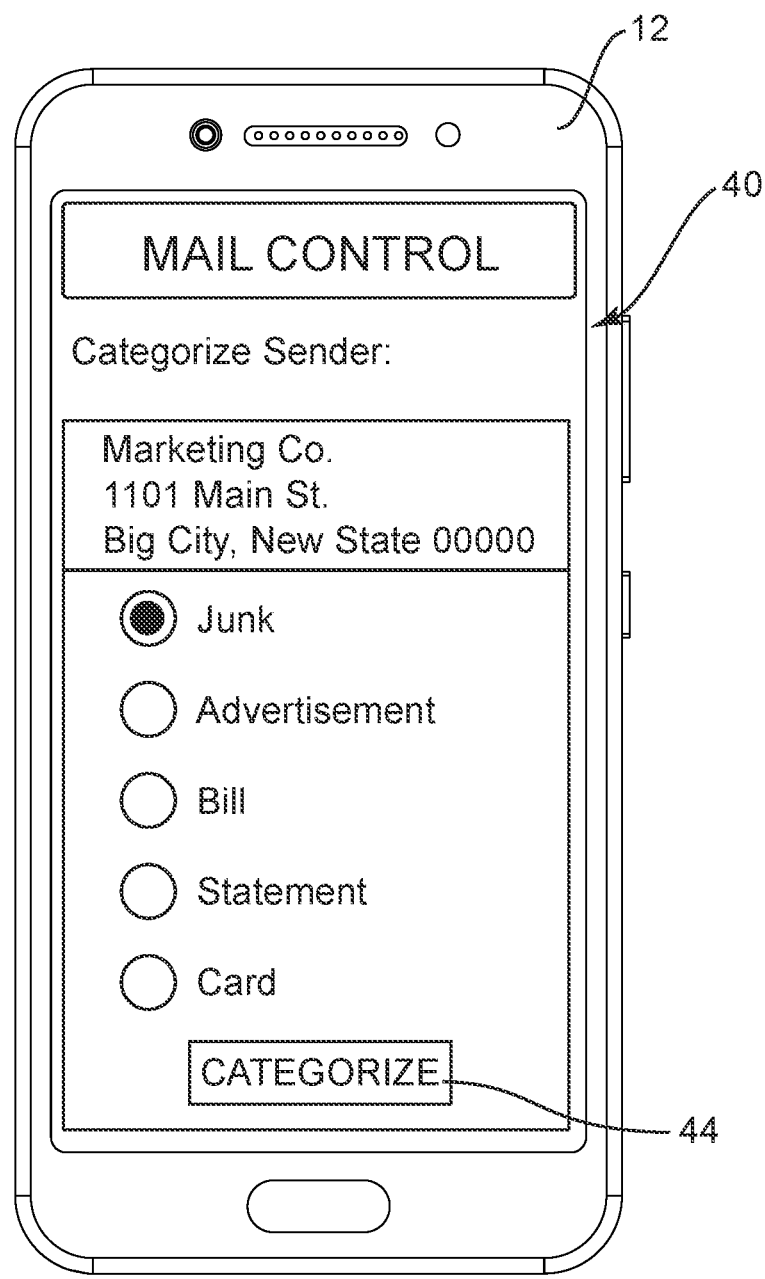
FIG. 4 is a front view of a user computing device operating on a digitized mail control system according to an embodiment.

The operation of the system 10 may be further seen in FIGS. 2-6. FIG. 2 depicts a user interface 20 accessed by a user computing device 12. As stated earlier, the server 14 may be programmed to create and send for execution on the user computing device 12 instruction to display mail data 22 on the user computing device 12 on interface 20. The mail data 22 may include sender information 24 of mail 20 received on a user-selected date. The user may then see all mail that is being delivered or has been delivered to have a visual inspection of the mail to be received or already received. Referring to FIG. 3, the server may also send, for display, mail data 32 on the user computing device 12 in interface 30. The mail data may include sender information of mail received on a user-selected date and action buttons 32 and 34 associated with predetermined actions to take in response to the sender information. For example the action buttons may include stop mail button 32 or category button 34. The selection of the stop mail button 32 results in the user computing device 12 sending a signal to the server 14, wherein the server 14 automatically performs steps to stop mail from the sender associated with that action button 32. The selection of the category button 34 may take the user to another user interface 40 as shown in FIG. 4.

FIG. 4 depicts a user interface 40 for categorizing senders of mail captured and digitized by the system 10. For example, the categories 44 may include, but are not limited to junk, advertisement, bill, statement, and cards. It will be understood that any amount or type of mail can be included in this interface 40 associated with the sender 42. The user may select a category or more than one category and elect the categorize button 44. The selection of the categorized button 46 results in a signal being sent from the user computing device 12 to the server 14 and storing in the server the category for the sender associated with the category 44 selected. This allows the user to view the various senders of mail and identify or parse the senders based on category.

The system 10 may be utilized for various types of actions. For example, the system may be used to select mail to be delivered and mail to be junked, such as that shown in FIG. 3, wherein the user may simply select "Stop Mail" button 32 and the mail will no longer be delivered, or as shown in FIG. 4, wherein the mail categorized as "junk" will not be delivered to the recipient, or future mail from that sender or address will not be delivered to the recipient.

Figure 5:
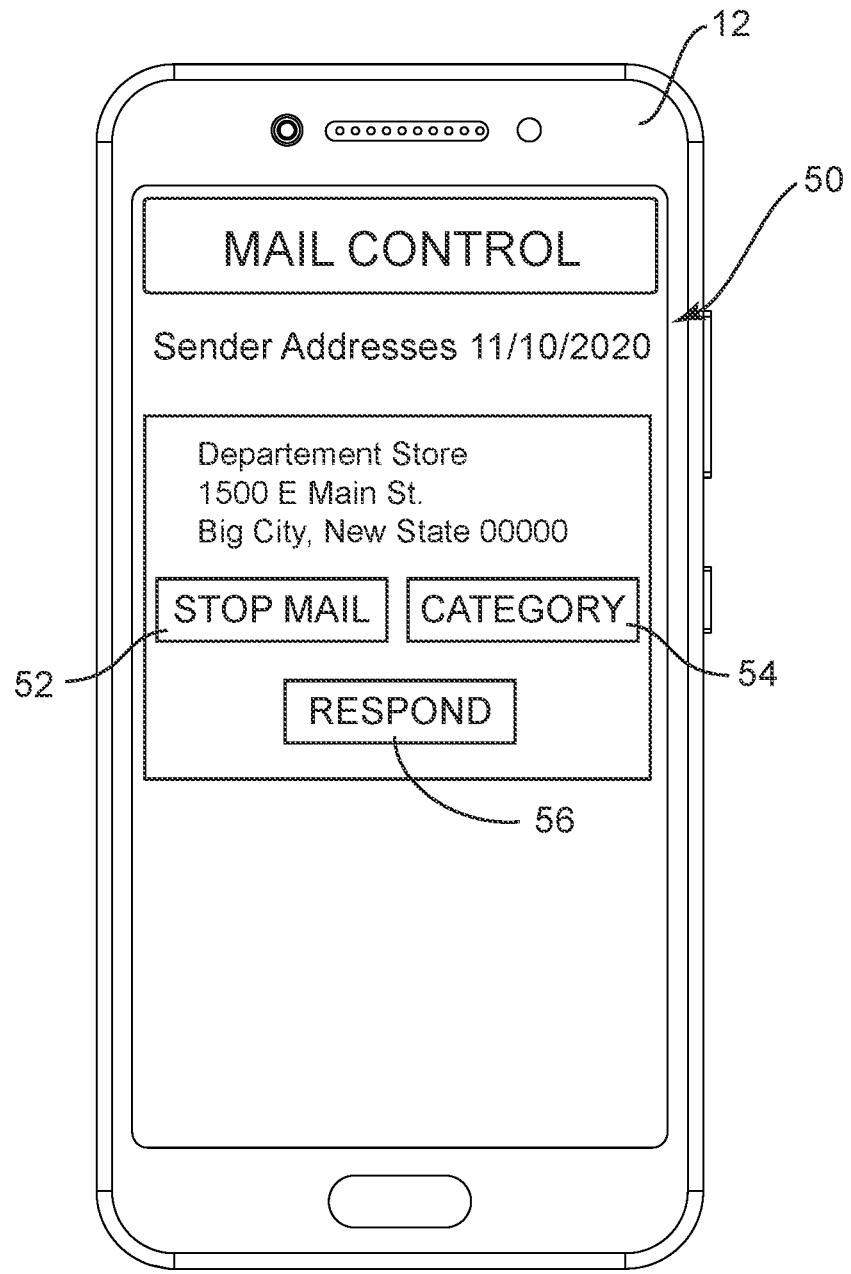
FIG. 5 is a front view of a user computing device operating on a digitized mail control system according to an embodiment.

Referring to FIG. 5, the system 10 may also allow the user to select mail to be responded to (manually or automatically). A user interface 50 for responding to mail captured and digitized by the system 10 is depicted. The system 10 may operate where the server may also send, for display, mail data on the user computing device 12 in interface 50. The mail data may include sender information of mail received on a user-selected date and action buttons 52, 54 and 56 associated with predetermined actions to take in response to the sender information. For example, the action buttons may include a stop mail button 52, a category button 54, and a respond button 56. The selection of the stop mail button 52 results in the user computing device 12 sending a signal to the server 14, wherein the server 14 automatically performs steps to stop mail from the sender associated with that action button 52. The selection of the category button 54 may take the user to another user interface 40 as shown in FIG. 4 and described previously. The selection of the respond button 56 may result in various types of interaction. In the example depicted in FIG. 5, the sender is a department store with an advertisement. The selection of the respond button 56, where the department store advertisement is the piece of mail may result in directing the user computing device 12 to open a web browser to the website of the sender. The user computing device 12 may then be used to interact with the website of the department store to purchase items and take advantage of the discount or deal advertised on the mail. This is one example of how mail may be digitized and then responded to digitally while utilizing the system. Other types of digital responses may be available using the system 10 that are not depicted in this example.

Figure 6:
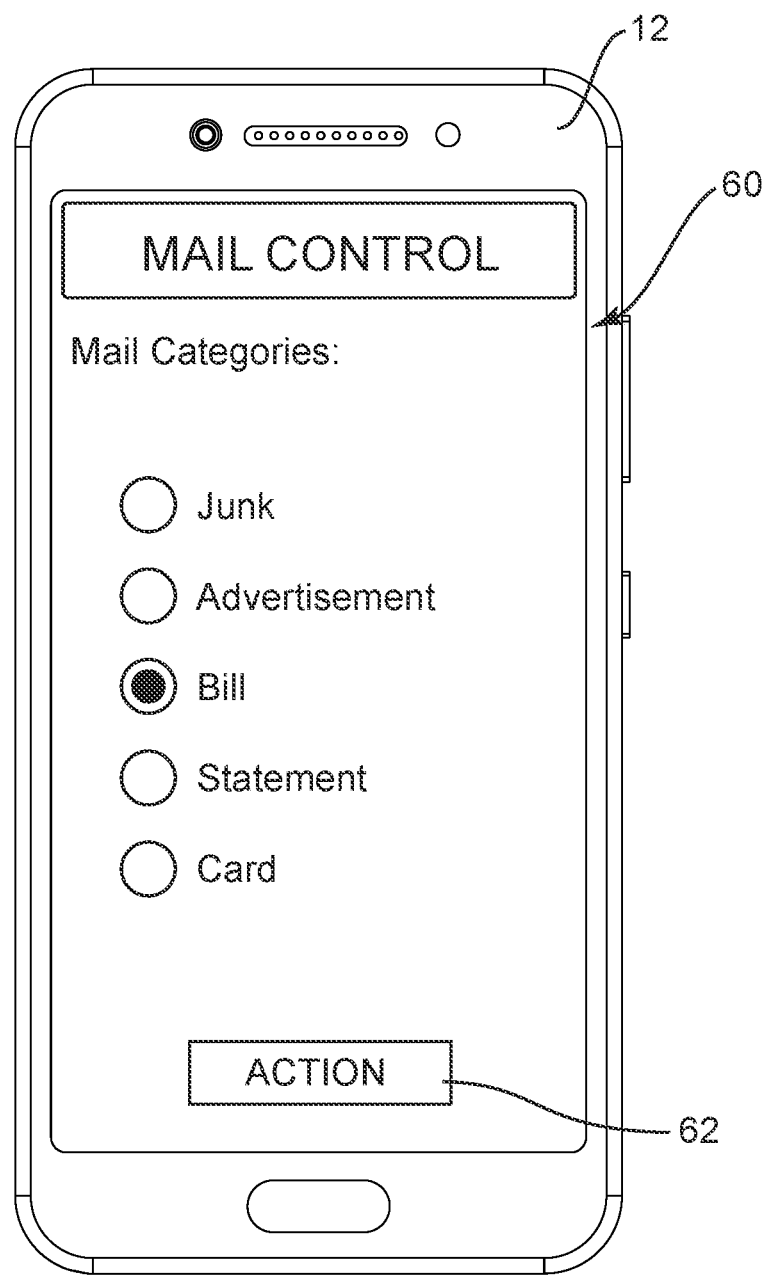
FIG. 6 is a front view of a user computing device operating on a digitized mail control system to control categories according to an embodiment.

Referring to FIG. 6, the system 10 may also allow the user to select categories of mail to take action on. A user interface 60 for responding to mail captured and digitized by the system 10 is depicted. In one embodiment, the user may select a category of mail that the user wishes to take action on and select a button 62 to proceed with the action. For example, as shown in FIG. 6, the user may select the "Bills" category and then selection the action button 62. The selection of the action button may direct the user to an interface to select a bill and then operate to pay the bill either manually or to allow the user to go directly to the website for the company issuing the bill an allow the user to pay the bill electronically through the Internet. Further, the system 10 depicted in FIG. 6 may be utilize may help in moving or help in keeping lists such as advertisement (See FIG. 7) or other categories, like Junk, Statements, Cards or the like. The system 10 may be used to obtain weekly, monthly and annual reports or mail categories or specific addresses. The system allows for tracking capabilities, such as, but not limited to, keeping track of mail accuracy in delivery, comparing scans to actual delivery, keeping track of mail while on holiday, keeping track of notices, and/or keeping track of sent mail by scanning outgoing mail. The system may be used to respond to senders for deceased recipients or other circumstances. The system may be used by companies or businesses to create mailing lists. Users may also opt in for mail of certain kinds automatically without having to send mail and save postage. The system 10 can be utilized to share mailboxes with others and keep track of mail. The system 10 may be used to cooperate with a post office to sort or toss mail before delivery. The system may also be used to have a return address automatically populated in email responses and provide instant responses, saving writing and mailing, or return auto response cards. The system may also be used to send out letters, or the like, to all senders stored in association with mail data for a particular user, such as for use by a family to notify all senders of mail that recipient has died and to no longer send mail to the recipient.

Figure 7:
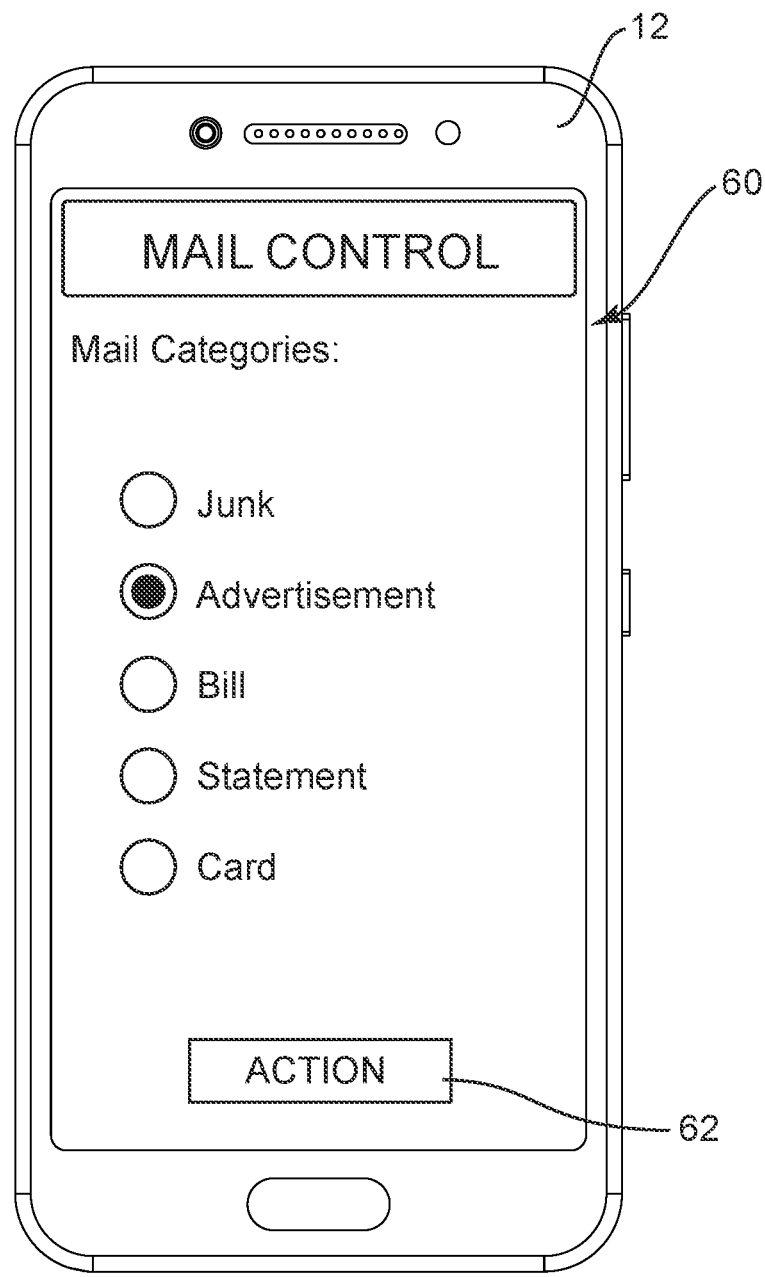
FIG. 7 is a front view of a user computing device operating on a digitized mail control system to control categories according to an embodiment.
Figure 8:
FIG. 8 is a front view of a user computing device operating on a digitized mail control system to control categories according to an embodiment.

The system 10 as depicted in FIGS. 7 and 8 allows additional types of control of mail to be received. The user interface 60 may allow a user to select a category of mail, such as, but not limited to, "Advertisement" as depicted and then select the action button 62. The selection of the action button 62 may then be directed to another user interface 70 as shown in FIG. 8. The user interface 70 depicts all mail that has been categorized as advertisement. The user may then select specific pieces of mail and then choose the next action, such as buttons 72 that allow the user to perform the following actions with regard to the selected mail, such as, but not limited to, "throw out", "deliver", "forward", and "redirect". Other types of action may be available and such action may change depending on the category selected by the user.

Figure 9:
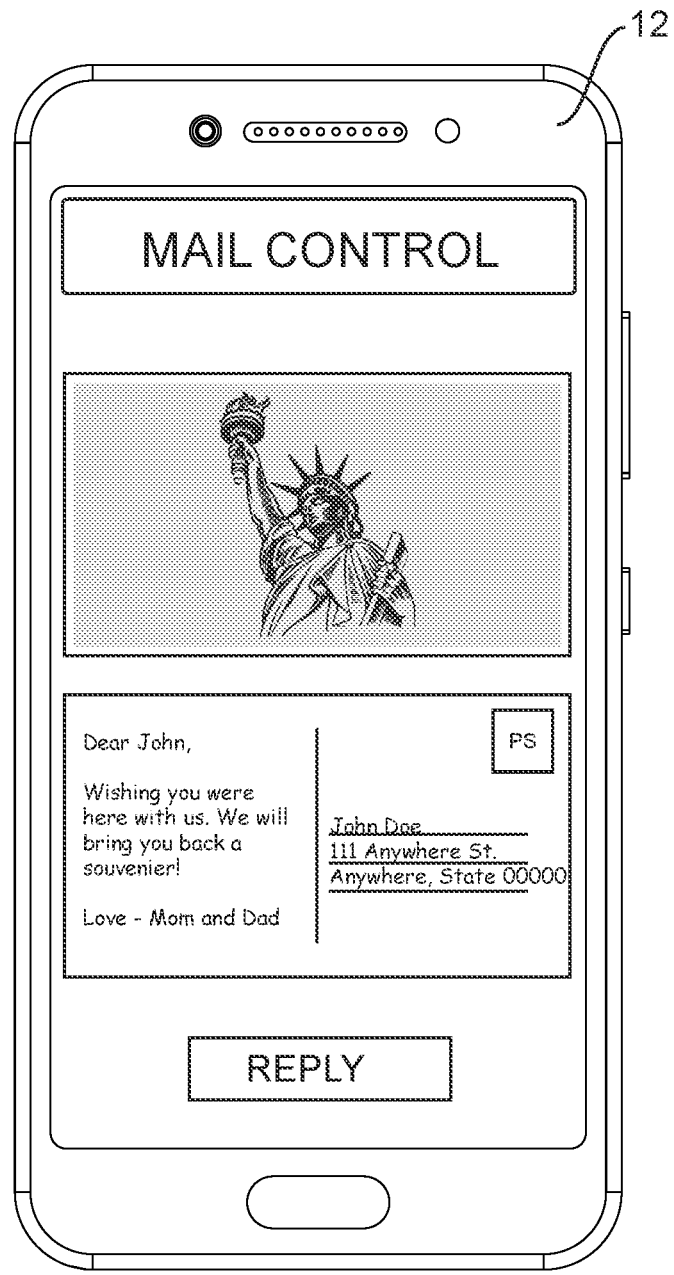
FIG. 9 is a front view of a user computing device operating on a digitized mail control system to view a post card according to an embodiment.
Figure 10:
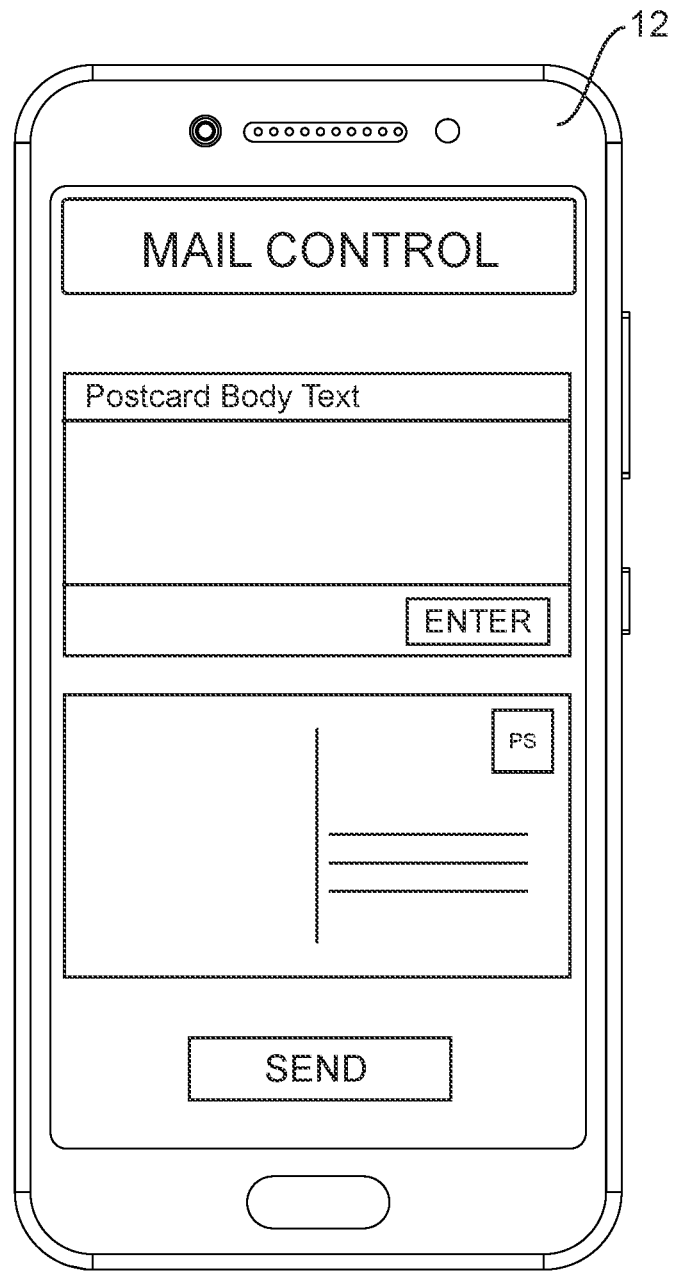
FIG. 10 is a front view of a user computing device operating on a digitized mail control system to reply to the post card according to an embodiment.
Figure 11:
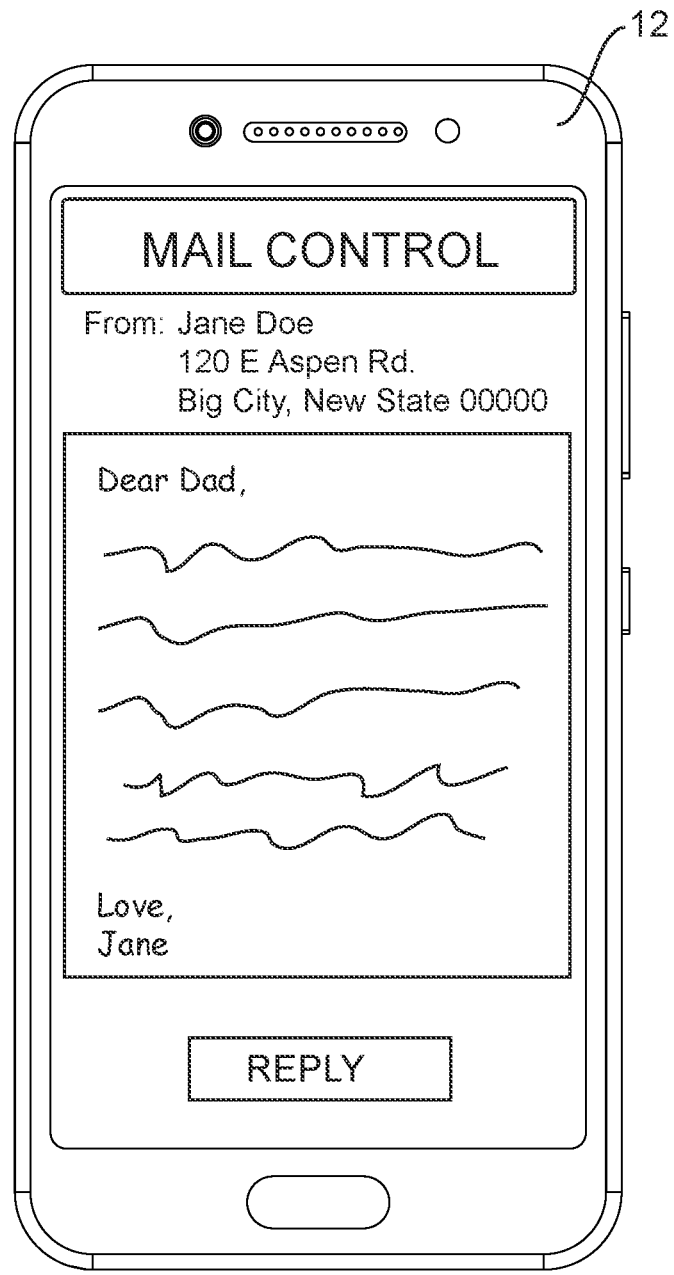
FIG. 11 is a front view of a user computing device operating on a digitized mail control system to view a letter according to an embodiment.
Figure 12:
FIG. 12 is a front view of a user computing device operating on a digitized mail control system to reply to the letter according to an embodiment.

The system may also be used to scan mail and respond to the scanned mail. Examples of this can be found in FIGS. 9-12. FIG. 9 depicts a user computing device 12 that depicts a post card that was scanned and available for view by the recipient. This can be scanned by the user or may be scanned by a mail delivery service that may open and scan the mail for digital delivery of the mail. The user may then select a reply button on the user interface and directed to the user interface shown in FIG. 10. The user may enter text and then send either a digital post card, such as through email, or the system can generate a physical post card and send it through the mail system. In like manner, FIG. 11 depicts a scanned letter, even a hand written letter. This may be accompanied by the sender information. The user may select the reply button and will be directed to the user interface depicted in FIG. 12. The system 10 may then allow for the input of a reply text for a reply communication to be sent to the sender. The system may store sender information, and may also include email addresses for the various senders whose information is stored. Further, in some embodiments, the system may search for sender information in the contacts of the user computing device 12, as depicted in FIG. 12. The system may then allow the user to select the form of response, such as email or paper, as depicted as buttons on the user interface shown in FIG. 12. With regard to replying to the piece of mail through an email, such a reply may include sending an image or scan of the piece of mail with the email for verification and information purposes.

Figure 13:
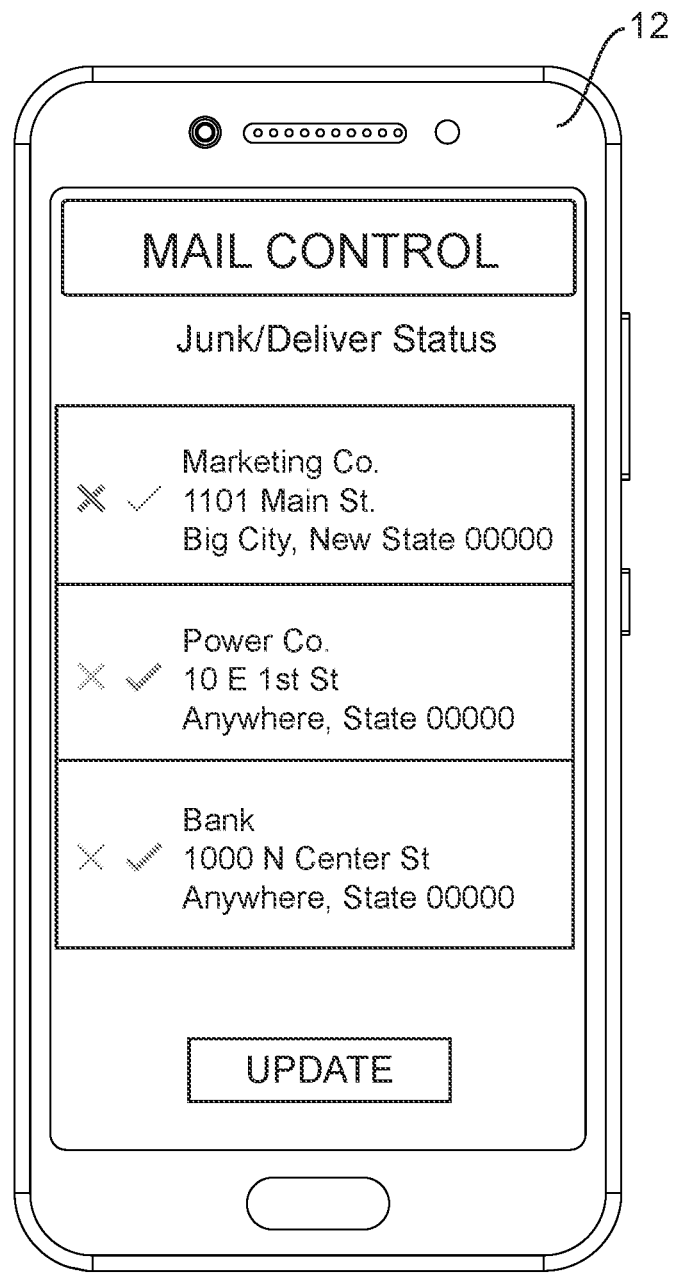
FIG. 13 is a front view of a user computing device operating on a digitized mail control system to update a delivery status of mail according to an embodiment.

In embodiments, the system 10 may be used to update the status of sorted senders of mail. For example, in FIG. 13, the various senders of mail may be depicted and the user can select an "X" to assign a stop mail action or a check mark to assign a delivery action. The selection of an update button may then be selected to effect the junk/delivery status of the mail.

Figure 14:
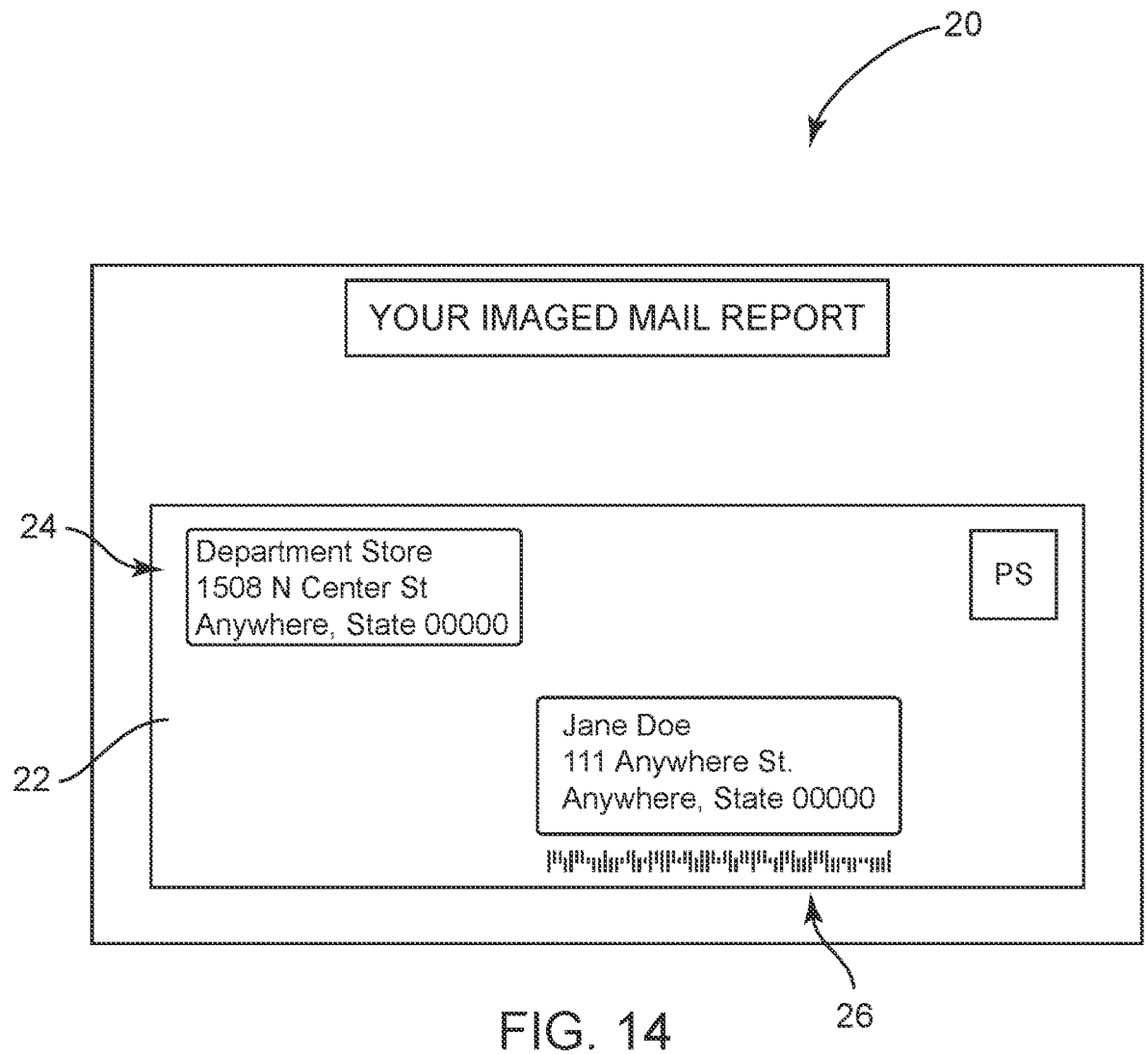
FIG. 14 is a front view of a user computing device operating on a digitized mail control system to scan a mail bar code according to an embodiment.
Figure 15:
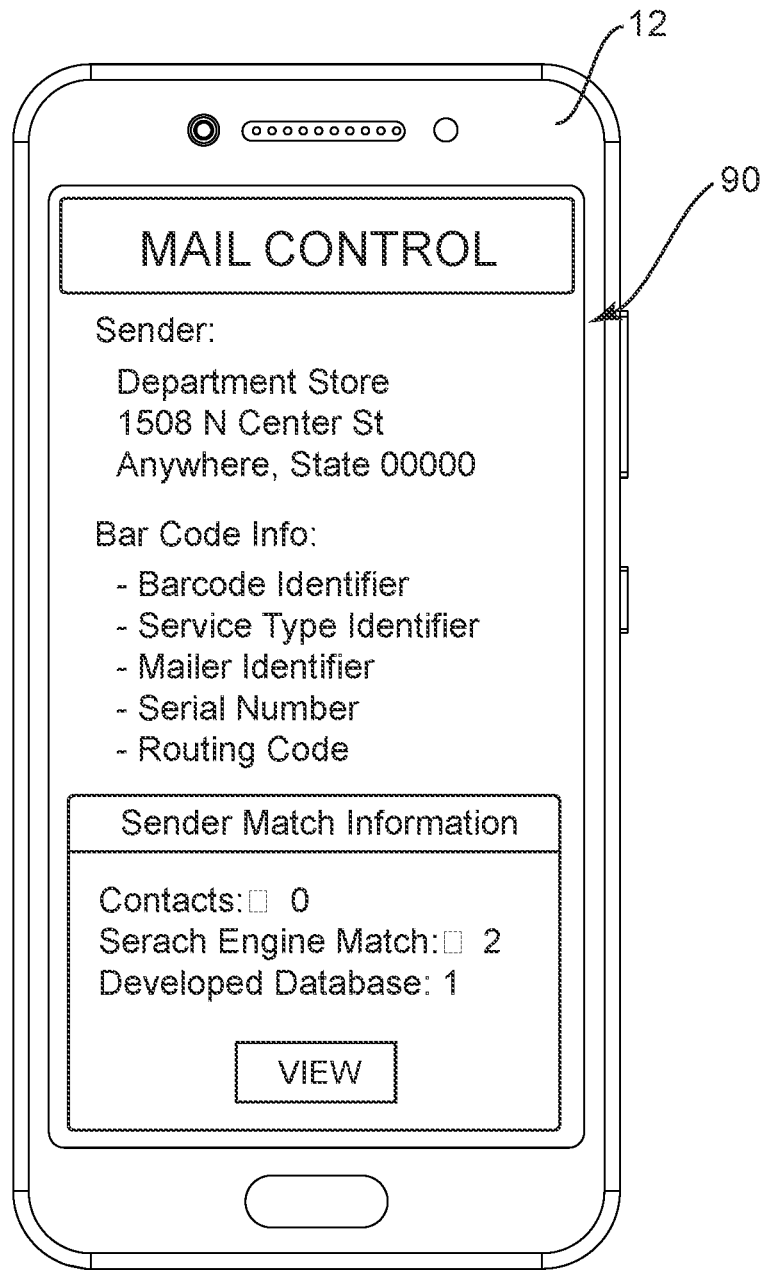
FIG. 15 is a front view of a user computing device operating on a digitized mail control system to automatically search various databases regarding a sender based on information from scanned bar code according to an embodiment.

Embodiments of the system 10 may operate to control data that is generated by scanning mail, both scans of physical mail and scans of barcodes applied to the mail. For example, the system 10 may be used to incorporate information provided by intelligent bar codes applied to mail. For example, the Intelligent Mail barcode may consist of a 20-digit tracking code that includes a Barcode Identifier, a Service Type Identifier, a Mailer Identifier, and a Serial Number and it may include a Routing Code (ZIP Code™) field of up to 11 digits. The system 10, as shown in FIG. 14 may operate to scan the barcode 26 on a piece of mail 22 from sender 24. Once the barcode has been scanned, the system 10 may operate to automatically perform scans of various databases in order to search for information regarding the sender information, including the information obtained from the barcode scan. The server 14 of the system 10 may then return matches from various databases returned in response to the performance of the scan. The information from the scanned barcode may be stored in the server 14 and may be provided to the user through sending the information to a user computing device 12 as depicted in FIG. 15. The information may include the sender information and the possible matches from various databases. The databases may include contacts stored in the user computing device 12, search engine matches, developed databases and the like. In these embodiments and other embodiments where the sender information is captured and/or a match has been performed, along with the capture of the service type provided, the mailer identifier and so forth, the server 14 may be programmed to predict a likely action.

Figure 16:
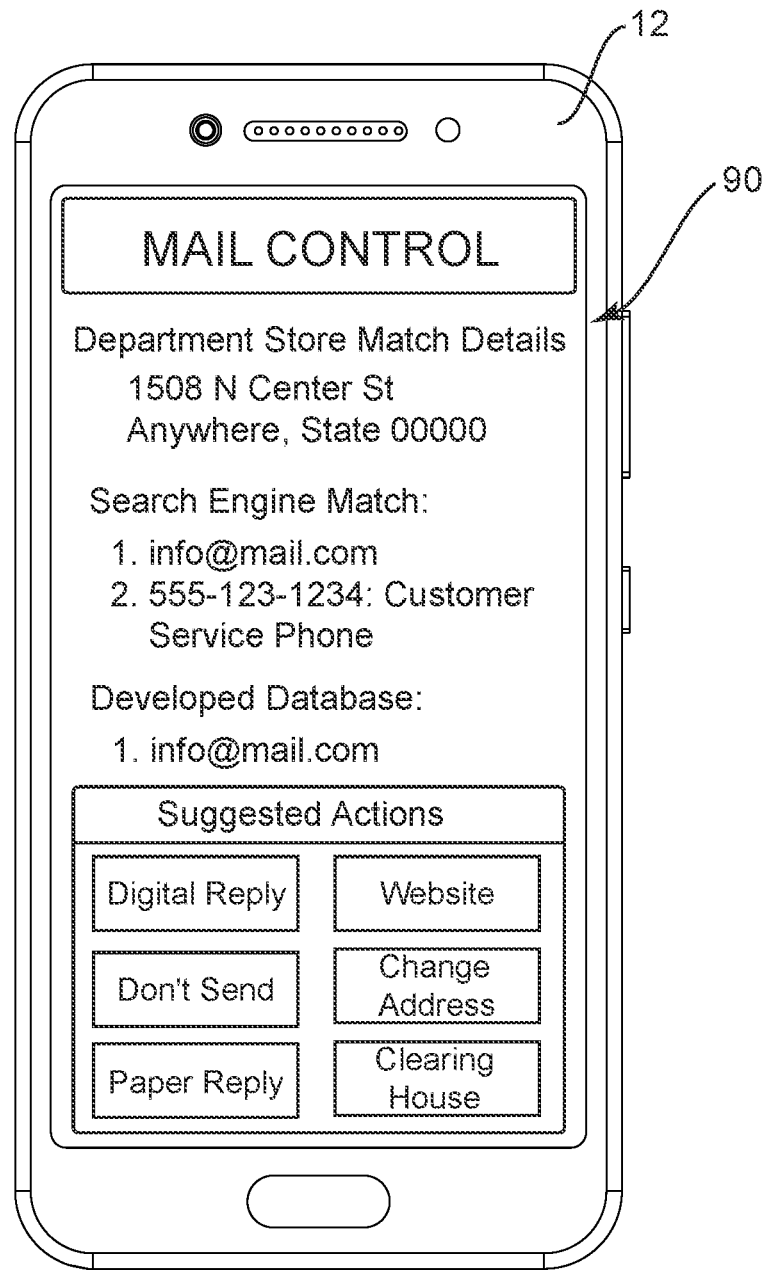
FIG. 16 is a front view of a user computing device operating on a digitized mail control system suggesting action to take regarding mail based on information from scanned bar code according to an embodiment.

In these embodiments, the server 14 may include artificial intelligence (AI) software programming that can access the mail data associated with the user, such as the information from scanning the intelligent mail barcode, the database match searches and then make recommended actions as shown in FIG. 16. As part of determining the recommended actions, the server 14 may be programmed with such AI software programming to analyze historical treatment of such mail by the user, accounting for any changes or trends in changes regarding certain types of mail, and then recommend an action to take based on past mail control actions by the user associated with that type of mail. The recommended actions may include, for example, and without limitation, digitally replying to the mail, paper replying to the mail, going to a website associated with the sender, requesting the mail service to not send the mail associated with the sender, changing the address of the recipient, or sending the mail to the clearing house. With regard to replying to the piece of mail through an email, such a reply may include sending an image or scan of the piece of mail with the email for verification and information purposes. Further still, sending the piece of mail to a clearinghouse service may operate to scan the junk mail and handle the unsubscribing or stop mail process for the recipient user. The system allows the user to digitally intervene with the paper mail being received, and control the captured data to stop mail, to convert paper mail communications to digital communications, to respond to mail through a digital interface as opposed to a paper response, and so forth. This will lead to the benefits as described above.

In some embodiments, the user may establish predefined preferences, and the AI software programming may be operated by the server 14 to process the predefined preferences after determining the type of sender or sorting of the mail and then automatically recommend an action, or in some embodiments, automatically execute an action responsive to the predefined preferences established by the user.

Embodiments may be available on or through the internet, such as through websites, web apps and the like.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

What is claimed is:

1. A digitized mail control system comprising:
a server having a memory storing mail data associated with a user; and
a user computing device coupled to the server, wherein the server is programmed to:
receive an access signal from the user computing device that has accessed the system, wherein the access signal includes user data;
in response to receiving the access signal from the user computing device, process the user data and locate the stored mail data associated with the user data;
create and send for execution on the user computing device instruction to display mail data including sender information of mail received on a user-selected date and at least one action button comprising a stop mail action corresponding to the sender information, wherein a user may then see all the mail that is being delivered or has been delivered to have a visual inspection of the mail to be received or already received; and
receive a signal including the stop mail action associated with at least one selected action button with regard to a selected sender and automatically execute program code corresponding to the stop mail from the selected sender.

2. The system of claim 1, wherein storing mail data includes scanning of physical mail by the server.

3. The system of claim 1, wherein storing mail data includes scanning of intelligent barcodes applied to mail received.

4. The system of claim 3, wherein the server is further programmed to automatically perform searches of various databases for information regarding the sender information, including the information obtained from the intelligent barcode scan.

5. The system of claim 4, wherein the various databases include one of contacts stored on the user computing device, search engine matches and developed databases.

6. The system of claim 5, wherein the server is further programmed to automatically send for display, on the user computing device, information obtained from the searches of the various databases.

7. The system of claim 6, wherein the server is further programmed with artificial intelligent code to analyze the information obtained from the searches of the various databases, and historical action taken by the user of the user computing device to recommend actions to take with regard to the mail received.

* * * * *